United States Patent [19]

Hobbie

[11] 4,008,464
[45] Feb. 15, 1977

[54] LUBRICANT CONTAMINATION WARNING DEVICE

[75] Inventor: James R. Hobbie, Mentor, Ohio
[73] Assignee: Eaton Corporation, Cleveland, Ohio
[22] Filed: Oct. 7, 1975
[21] Appl. No.: 620,453
[52] U.S. Cl. .............................. 340/239 R; 210/85; 335/305; 340/270
[51] Int. Cl.² ........................................ G08B 21/00
[58] Field of Search ............... 340/239 R, 269, 270, 340/236; 200/61.09; 335/305, 306, 302; 324/8, 41; 210/85, 222, 223; 73/61 R

[56] References Cited
UNITED STATES PATENTS

| | | | |
|---|---|---|---|
| 2,462,715 | 2/1949 | Booth | 340/270 |
| 3,170,871 | 2/1965 | Moriya | 210/222 |
| 3,193,815 | 7/1965 | Prestel | 340/236 |
| 3,373,352 | 3/1968 | Huigens | 324/41 |

Primary Examiner—John W. Caldwell
Assistant Examiner—Daniel Myer
Attorney, Agent, or Firm—Teagno & Toddy

[57] ABSTRACT

Apparatus for providing an electrical warning signal when ferrous contamination builds up in the lubricant of a mechanism utilizing gearing. The apparatus includes a pair of annular magnetic members positioned in a spaced-apart relation on a support member. The support member is attached to the lubricant filler plug so that the magnets are above the normal lubricant level within the mechanism, but are exposed to the normal lubricant flow during operation of the mechanism. The magnetic members are part of a normally-open electrical circuit in which one of the magnets is connected to a source of electrical potential and the other magnet is grounded. One portion of the circuit is then connected to an electrically-actuated warning device so that when ferrous contamination on one of the magnet members comes into contact with ferrous contamination on the other magnetic member, the circuit is closed and a warning signal is provided to the operator of the mechanism.

7 Claims, 3 Drawing Figures

LUBRICANT CONTAMINATION WARNING DEVICE

BACKGROUND OF THE DISCLOSURE

The present invention relates to a lubrication system for a geared mechanism, and more particularly, to a device which warns the operator that a buildup of ferrous contamination has occurred.

It has long been known to provide some type of magnetic member attached to the filler plug of a mechanism having rotating gearing which is subject to ferrous contamination. The purpose of such a magnetic member has been to gather the magnetic particles so that the operator could unscrew the filler plug and remove the particles from the magnet, then replace the filler plug. Such a system, of course, operates in reliance on the operator remembering to check the contamination buildup periodically, and if he does not do so, an excessive buildup of ferrous particles may cause wear of the gearing, and possibly, blockage of certain lubricant paths, resulting in a partial or total loss of lubricant in a particular portion of the mechanism.

This is especially a problem in mechanisms such as axle assemblies, and even more so, in tandem axle assemblies for which the operator would be required to check the contamination buildup at three or more locations. Therefore, although the present invention may be used with any type of geared mechanism having a lubricant flow which is subject to ferrous contamination, it is especially advantageous when used with axle assemblies, and will be described in connection therewith.

SUMMARY OF THE INVENTION

Accordingly, it is an object of the present invention to provide a warning system for use with a geared, lubricated mechanism wherein the operator of the mechanism will be given a signal when the ferrous contamination reaches approximately a predetermined level.

It is a further object of the present invention to provide a warning system, in accordance with the above-stated object, in which the mechanism operator is not required to check periodically on the contamination level or take any other positive action to determine the contaminant level.

The above and other objects of the present invention are accomplished by the provision of an apparatus for providing an electrical warning signal which represents a buildup of ferrous contamination in the lubricant to a predetermined level. The apparatus comprises first and second magnetic members and means for fixedly positioning the magnetic members within the housing of the mechanism, exposed to the normal lubricant flow. The positioning means insulates the first magnetic member from the second magnetic member and maintains the members spaced apart to define a gap. A normally-open electrical circuit includes a first circuit portion connected to one of the magnetic members and adapted for connection to a source of electrical potential, and a second circuit portion connected to the other magnetic member. The magnetic members are disposed to close the normally-open circuit when ferrous contamination on the first magnetic member comes into contact with ferrous contamination on the second magnetic member.

Preferably, one of the circuit portions is grounded to the mechanism housing, and one of the circuit portions may be connected to an electrically-actuated warning device such as a light on the operator's control panel.

DESCRIPTION OF THE PREFERRED EMBODIMENT

Figure 1:
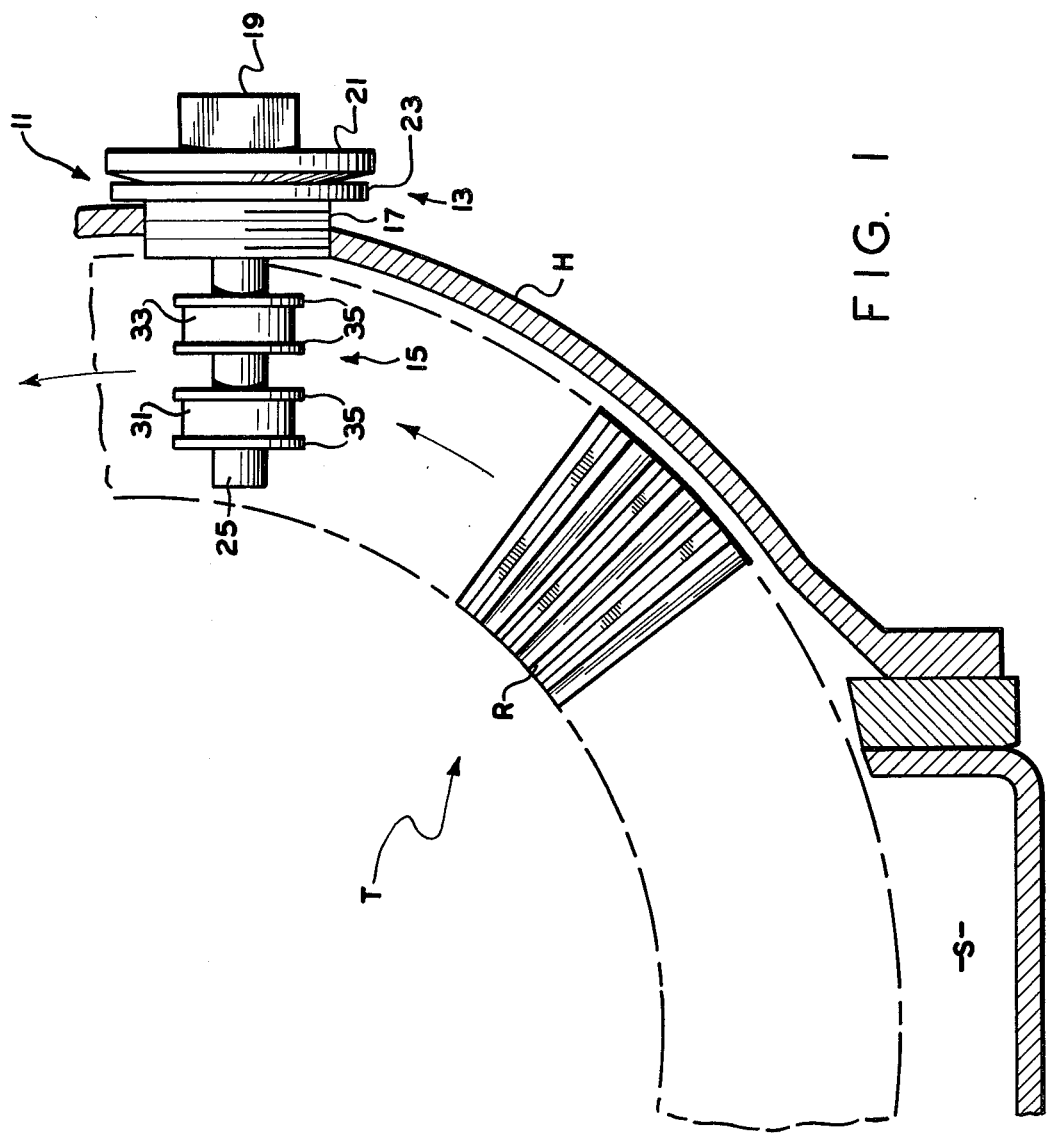
FIG. 1 is a fragmentary cross section of a portion of an axle assembly, adapted to utilize the present invention.

Referring now to the drawings, which are not intended to limit the present invention, FIG. 1 is a longitudinal cross section through a tandem axle assembly, generally designated T, which includes a housing H. At the bottom of the housing H is sump pan S, bolted to the housing H. rotatably disposed within the housing H is a bevel ring gear R which rotates through a reservoir of the lubricant (not shown), to cause an upward flow of the lubricant, as is indicated by the arrows.

In threaded engagement with the housing H is a filler plug assembly, generally designated 11, which includes a plug portion 13 and a magnet portion 15. Plug portion 13 includes a thread portion 17, in threaded engagement with a set of mating, internal threads defined by the housing H and a plug head 19, including a flange 21. The plug head 19 may be square or some other suitable shape which permits tightening engagement by means of a wrench. Disposed about the thread portion 17, between the housing H and the flange 21 is a sealing gasket 23. The magnet portion 15 includes a support member 25 which may be press fit into a bore 27 defined by thread portion 17 (see FIG. 2). Disposed on the support member 25 is a pair of annular magnetic members 31 and 33, each of which has a disc-like member 35 disposed on either side thereof. It will be appreciated that the support member 25 should be made of material which is both a magnetic insulator and an electrical insulator (such as nylon or bakelite), in order to provide a normally-open circuit relationship between the magnetic members 31 and 33.

Figure 2:
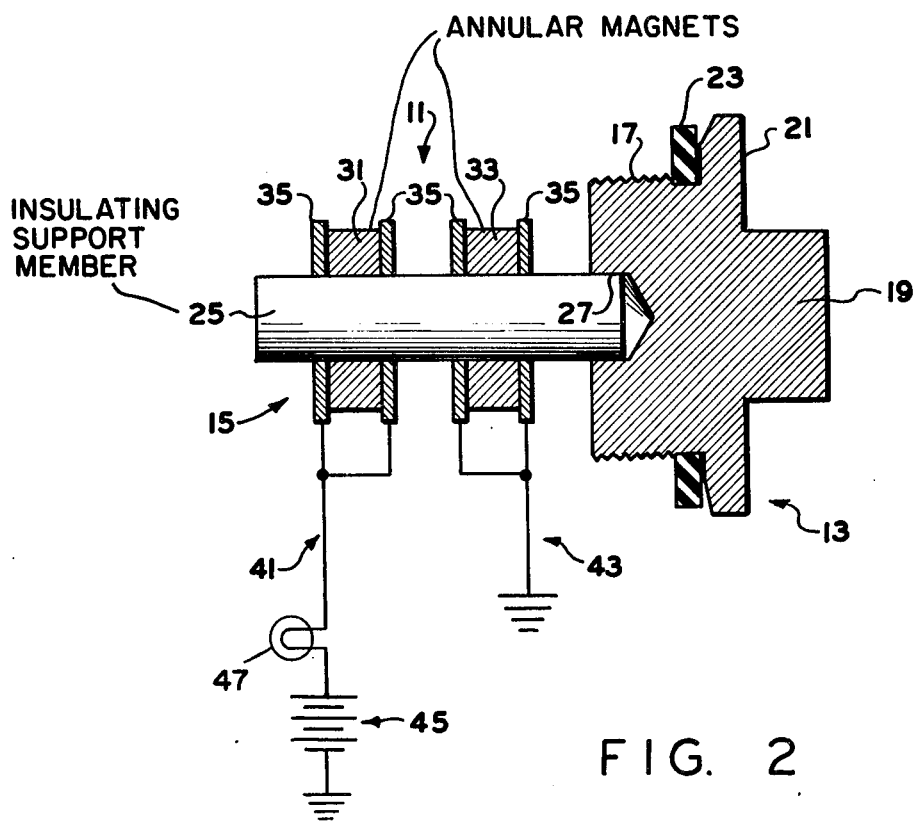
FIG. 2 is an illustration of the warning system of the present invention, partly in cross section and partly in schematic.

Referring now to FIG. 2, an enlarged view of the present invention is shown, partly in cross section and partly in schematic. The system of the present invention includes a circuit portion 41 connected to the disc-like members 35 surrounding magnetic member 31, and a circuit portion 43 connected to the disc-like members 35 surrounding magnetic member 33. Although the circuit portions 41 and 43 are shown as being connected to the disc-like members 35, it will be understood that the circuit portions may be connected to the magnetic members in a number of different ways, and that the particular connecting arrangement is not an essential feature of the invention.

Circuit portion 41 is series-connected to a source of electrical potential 45 which, in the subject embodiment, may be the D.C. output from the vehicle battery or generator. Also forming a part of the circuit portion 41 is a warning light 47, preferably located somewhere in the vehicle cab, although, within the scope of the present invention, the warning light 47 may be replaced by any other known type of electrically-actuated warning device such as a buzzer or bell.

If the source of electrical potential 45 is a D.C. source, the circuit portion 43 is merely grounded, which may be accomplished by connecting the magnetic member 33 or its adjacent disc-like members 35 to some part of the plug portion 13 such as the thread portion 17, thus providing the entire housing H as a ground. If, on the other hand, the source of potential 45 is an A.C. source, it will be apparent that the circuit portion 43 must be connected back to the potential source 45, leaving only the gap between the magnetic members 31 and 33 electrically open.

Figure 3:
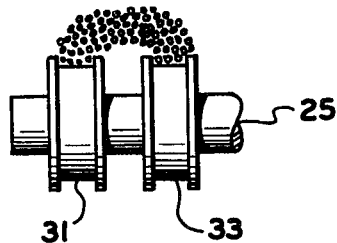
FIG. 3 is a fragmentary view showing a build-up of ferrous contamination.

The operation of the warning system of the present invention is shown somewhat schematically in FIG. 3 wherein a buildup of ferrous particles has occurred around the outer periphery of each of the magnetic members 31 and 33. As the buildup continues, eventually the gap between the magnetics 31 and 33 is bridged sufficiently to provide an electrical conducting path, the resistance of which is low enough to permit electrical current to pass and actuate the warning light 47. Upon receiving the warning, the vehicle operator removes the filler plug assembly 11, and removes the ferrous contamination from the plug assembly. If such an excessive buildup of ferrous contamination occurs too rapidly, it may be an indication to the operator that damage has occurred somewhere in the gearing, thus providing the opportunity to make any necessary repairs before either the gearing damage or the ferrous contamination cause a more serious malfunction.

I claim:

1. Apparatus for providing an electrical warning signal representative of a buildup of ferrous contamination in the lubricant of a mechanism including a housing and rotating gearing, and apparatus being adapted for connection to a source of electrical potential comprising:
   a. first and second magnetic members, each of said magnetic members being generally annular in configuration and having an aperture therein;
   b. means received in said aperture in each of said magnetic members for fixedly positioning said magnetic members within the housing so as to be exposed to the normal lubricant flow, said magnetic members being spaced apart to define a gap;
   c. said positioning means electrically insulating said first magnetic member from said second magnetic member; and
   d. normally-open electrical circuit means including a first circuit portion connected to one of said magnetic members and adapted for connection to said source of electrical potential, and a second circuit portion connected to the other of said magnetic members, said magnetic members being operably disposed to close said normally-open circuit when ferrous contamination on said first magnetic member comes into contact with ferrous contamination on said second magnetic member.

2. The apparatus as claimed in claim 1 wherein said positioning means includes an elongated, cylindrical member comprising an electrically insulating material.

3. The apparatus as claimed in claim 2 wherein said magnetic members are received on said cylindrical member in an interference fitting relationship.

4. The apparatus as claimed in claim 1 wherein said positioning means includes a filler plug member in threaded engagement with said housing and an electrically non-conductive shaft member in engagement with said plug member, said shaft member having said magnetic members mounted thereon.

5. The apparatus as claimed in claim 1 wherein said second circuit portion is electrically grounded to the housing and the source of electrical potential provides a direct current.

6. The apparatus as claimed in claim 1 wherein one of said first and second circuit portions includes an electrically-actuated warning device disposed to provide a warning to a mechanism operator.

7. An axle mechanism of the type including a housing, rotating gearing and a filler plug in threaded engagement with the housing above the normal lubricant level, said mechanism being adapted for connection to a source of electrical potential and characterized by:
   a. an elongaged support member in fixed engagement with the filler plug and disposed to extend inwardly from the housing;
   b. first and second generally annular magnetic members positioned on said support member and exposed to the normal lubricant flow caused by the rotating gearing, said magnetic members being spaced apart to define a gap;
   c. said support member electrically insulating said first magnetic member from said second magnetic member;
   d. normally-open electrical circuit means including a first circuit portion connected to one of said magnetic members and adapted for connection to said source of electrical potential, and a second circuit portion connected to the other of said magnetic members, said magnetic members being operably disposed to close said normally-open circuit when ferrous contamination on said first magnetic member comes into contact with ferrous contamination on said second magnetic member.

* * * * *

UNITED STATES PATENT OFFICE
CERTIFICATE OF CORRECTION

Patent No. 4,008,464              Dated  Feburary 15, 1977

Inventor(s)   James R. Hobbie

It is certified that error appears in the above-identified patent and that said Letters Patent are hereby corrected as shown below:

Column 2, line 23, "rotatably" should read -- Rotatably --.

Claim 1, line 36, "and", second occurrence, should read -- said --.

Signed and Sealed this

Nineteenth Day of April 1977

[SEAL]

Attest:

RUTH C. MASON
*Attesting Officer*

C. MARSHALL DANN
*Commissioner of Patents and Trademarks*